US012678796B2

(12) United States Patent
Olivier

(10) Patent No.: US 12,678,796 B2
(45) Date of Patent: Jul. 14, 2026

(54) RACK FOR HOLDING A PLURALITY OF PETRI-DISHES AND TRANSPORT PACKAGING WITH THE RACK

(71) Applicant: Merck Patent GmbH, Darmstadt (DE)

(72) Inventor: Stephane Olivier, Molsheim (FR)

(73) Assignee: MERCK PATENT GMBH, Darmstadt (DE)

( * ) Notice: Subject to any disclaimer, the term of this patent is extended or adjusted under 35 U.S.C. 154(b) by 636 days.

(21) Appl. No.: 18/032,883

(22) PCT Filed: Oct. 20, 2021

(86) PCT No.: PCT/EP2021/079012
§ 371 (c)(1),
(2) Date: Apr. 20, 2023

(87) PCT Pub. No.: WO2022/084356
PCT Pub. Date: Apr. 28, 2022

(65) Prior Publication Data

US 2023/0285978 A1 Sep. 14, 2023

(30) Foreign Application Priority Data

Oct. 23, 2020 (EP) .................................... 20306273

(51) Int. Cl.
*B01L 9/00* (2006.01)

(52) U.S. Cl.
CPC .................................. *B01L 9/523* (2013.01)

(58) Field of Classification Search
CPC ...... B01L 2200/185; B01L 9/52; B01L 9/523; C12M 23/10; C12M 23/38; C12M 23/46; C12M 23/48
See application file for complete search history.

(56) References Cited

U.S. PATENT DOCUMENTS

| | | | |
|---|---|---|---|
| 3,562,114 | A | 2/1971 | Steidl et al. |
| 2002/0053525 | A1 | 5/2002 | Zingre |
| 2012/0251275 | A1 | 10/2012 | Malin |

FOREIGN PATENT DOCUMENTS

| | | |
|---|---|---|
| CN | 207191762 U | 4/2018 |

OTHER PUBLICATIONS

International Search Report PCT/EP2021/079012 dated Feb. 4, 2023 (pp. 1-2).

*Primary Examiner* — Jennifer Wecker
*Assistant Examiner* — Jonathan Bortoli
(74) *Attorney, Agent, or Firm* — Millen, White, Zelano & Branigan, P.C.; Brion P. Heaney

(57) ABSTRACT

The present application relates to a rack (1) for holding a plurality of petri-dishes (P), comprising a main body (2) with a plurality of adjacent and spaced apart holding portions (3) each configured to receive and support, in a substantially parallel orientation that is substantially perpendicular to a longitudinal direction (X) of the rack (1), a petri-dish (P), wherein each holding portion (3) includes positioning features (4) for positioning the petri-dish (P) in the holding portion (3) and allowing insertion of the petri-dish (P) from a lateral side in a direction substantially perpendicular to the longitudinal direction (X). The holding portions (3) and positioning features (4) respectively comprise a pair of separation elements (11) spaced apart from each other to define therebetween a slot (12) configured to receive the petri-dish (P).

16 Claims, 12 Drawing Sheets

RACK FOR HOLDING A PLURALITY OF PETRI-DISHES AND TRANSPORT PACKAGING WITH THE RACK

TECHNICAL FIELD

The present application concerns a rack for holding a plurality of petri-dishes and a transport packaging, preferably in the form of a blister packaging with the rack. The present application particularly concerns the field of testing in pharmaceutical and food processing and more particularly environmental monitoring of clean or ultra clean processing areas. It is also applicable to other processing situations where cleanness of a processing area or environment is to be determined and monitored, for example in the field of semiconductor, electronics or aircraft manufacturing.

BACKGROUND

In order to monitor environmental conditions in closed processing areas of the above type it is common practice in passive air sampling to place one or more media plate/plates in an activity zone of the production area and expose them to the surrounding air such that they can capture the maximum amount of particles in the surrounding air. Larger particles tend to settle faster on the plates due to gravitational force. Smaller particles take some time in settling due to factors such as air currents. Media plates work best in still areas. The microorganisms from the air may settle on the media plates alone or in colonies.

In active monitoring of air in production areas a microbial air sampler is used to force air into or onto a collection medium over a specified period of time. The collection medium can be a common petri-dish, for example including a nutrient agar-based test media or other suitable test media depending on the need.

The collection media, for example in the form of the petri-dishes, media plates or settle plates (the terms will be used interchangeably in this specification), have to be transferred repeatedly into the production area and removed therefrom for further handling and evaluation. This is commonly done in a manual process where one or more plates or petri-dishes are conveyed manually through a sterile transfer port into and from the interior of the production area. However, the manual handling of the petri-dishes involves a high risk of contamination when handling the media plate after a lid, cover or seal has been opened, and a non-secure transfer of the media plates during the introduction, installation, removal and further handling, in particular when a plurality of them are handled at once as a set or batch or group, for example in a stack. Maintaining several petri-dishes in a group during a sequence of processing steps is moreover a complex task and requires measures like taping or bundling several petri-dishes together and/or marking them.

Further, the individual petri-dishes as such are not particularly suitable for automated handling in batches or stacks as they typically consist of a media plate holding the nutrient media and a lid or cover releasably covering the plate. It is difficult for automated handling equipment to securely grip, hold and transfer the smooth cylindrical peripheral surfaces of the media plate and/or lid/cover as they require a defined position and orientation for gripping, and there is a high risk that lids are inadvertently opened, displaced or removed from their media plates during handling at the various stages of the process, thereby compromising the detection result.

US 2002/053525 A1 discloses a cassette arrangement for accommodating petri-dishes or the like. The arrangement includes a box-shaped cassette housing designed to be stackable and having a slotted opening on one lateral side for inserting or removing the petri-dish from an interior space of the housing. The box-shaped cassette housing is stackable and has finger-operated means arranged on an opposite end side for pushing the petri-dish in the cassette housing out at least partially through the opening. While this cassette arrangement provides for a safe transport of the petri-dish held in the interior space of the cassette housing, it is not useful for automated handling as it is specifically directed to a manual operation by a finger in order to at least release the petri-dish from the housing. Further, the stacking capability is not specifically reliable and likewise not suitable for automated handling of a stack of cassette housings.

What is desired is an at least partly or preferably fully automated process that does not involve human handling steps for introducing, installing and removing the media plates into and from the production areas and further stages of the evaluation processes.

It is furthermore preferable to provide means for such a partly or fully automated process with which it is possible to use standard media plates available on the market, preferably the so-called petri-dishes.

The present application accordingly aims at providing a device for holding a plurality of petri-dishes and a transport packaging, preferably in the form of a blister packaging with a plurality of petri-dishes, which allows secure handling of petri-dishes or settle plates used for microbiological air sampling in a classified or non-classified environment reducing the risk of false positive and final product contamination, which allows a secure handling during the air testing from storage, transportation to sampling area, sampling, counting, waste management for passive or active microbiological air sampling in a fully or partially automated process, i.e. the manual handling should at least not be excluded.

SUMMARY

According to the present application this object is solved by providing a rack for holding a plurality of petri-dishes as defined in claim 1 and a transport packaging for a plurality of petri-dishes as defined in claim 9 as well as a blister packaging with a plurality of petri-dishes as defined in claim 13. Preferred embodiments are defined in the dependent claims.

The present application specifically provides a rack for holding a plurality of petri-dishes, comprising a main body with a plurality of adjacent and spaced apart holding portions each configured to receive and support, in a substantially parallel orientation that is substantially perpendicular to a longitudinal direction of the rack, a petri-dish, wherein each holding portion includes positioning features for positioning the petri-dish in the holding portion and allowing insertion of the petri-dish from a lateral side in a direction substantially perpendicular to the longitudinal direction.

Preferably, the holding portions and positioning features respectively comprise a pair of separation elements spaced apart from each other to define therebetween a slot configured to receive the petri-dish.

Preferably, each separation element includes one or more elastic tab/tabs configured to releasably engage, preferably at a tip end of the tab, with a rim/edge of the petri-dish when the same is placed in the slot.

Preferably, each separation element comprises a pair of the elastic tabs of which each tab is reaching, preferably by being inclined from a reference plane perpendicular the longitudinal direction, into a different one of the slots adjacent to the separation element so that one of the tabs releasably engages with the rim/edge of a dish of a petri-dish in the one slot and the other one releasably engages with the rim/edge of a lid of a petri-dish in the adjacent slot.

Preferably, the holding portions and positioning features are formed and configured to allow insertion of a gripper of a manipulating device or of a pair of fingers from the lateral side for grabbing/pinching a circumferential peripheral wall of a petri-dish when the same is placed in the holding portion.

Preferably, the separation elements are connected by a pair of spaced apart lateral supporting beams extending in the longitudinal direction of the rack and carrying therebetween the separation elements defining the holding portions so as to form a cradle-like self-supporting structure.

Preferably, the cradle-like self-supporting structure has windows open toward a lateral side different, preferably opposite from the lateral side for insertion of the petri-dishes, the windows allowing visual inspection of the Petri-dishes when the same are received in the holding portions.

Preferably, the cradle-like self-supporting structure includes a stand configured to hold the cradle-like self-supporting structure in an upright orientation such that the petri-dishes can be received and supported in the substantially horizontal orientation in the holding portions.

The present application also provides a transport packaging for a plurality of petri-dishes, comprising a rack as defined herein and a box-shaped tub configured to removably receive and surround the rack.

Preferably, the box-shaped tub is formed as a one-piece blister cavity, preferably formed from a formable sheet or web material, further preferably by thermoforming or cold-forming or a combination.

Preferably, the box-shaped tub and the rack are made from the same material.

Preferably, the transport packaging further comprises a plurality of petri-dishes accommodated in the slots of the rack.

The present application also provides a blister packaging with a plurality of Petri-dishes comprising the transport packaging as defined herein, wherein the plurality of petri-dishes are accommodated in the rack in the box-shaped tub in a sterile environment, and a gas barrier film, preferably at least partially transparent, sealing the opening of the box-shaped tub.

The present application accordingly provides a rack for holding a plurality of petri-dishes. It is compatible with environmental monitoring in a fully automated process. It in particular allows an accurate positioning and holding together of a set or batch of petri-dishes in a device that can be used during all the steps or stages of the monitoring process, including packaging and shipment, during introduction into the clean production area, setting in the loading and unloading area, grabbing of individual petri-dishes using a gripper or robot arm for transferring the dishes to critical areas for passive or active air monitoring, during removal from the clean production area, during incubation, reading and/or storage.

BRIEF DESCRIPTION OF THE DRAWINGS

Preferred embodiments will be described below by reference to the attached exemplary schematic drawings, in which.

DETAILED DESCRIPTION

For the purposes of the present application, terms such as "horizontal", "vertical", "perpendicular", "parallel", and similar terms are—if not already explicitly indicated—considered to be "essentially horizontal", "essentially vertical", "essentially perpendicular", "essentially parallel", provided that this does not negatively affect functionality. Preferably, the term "essentially" is to denote a deviation of at most 10°, more preferably of at most 5°, even more preferably of at most 4° or 3°, still even more preferably of at most 2° or 1° from being horizontal, vertical, and perpendicular, respectively.

The invention will be described using two embodiments of the rack 1 as examples. Similar views of the rack of the embodiments are distinguished by adding the letter "a" or "b" to the number of the figure. Thus, where reference is made to a particular figure without adding the letter "a" or "b", the description is applicable to both embodiments even if no specific figure of that embodiment is provided unless explicitly stated otherwise.

Figure 2A:
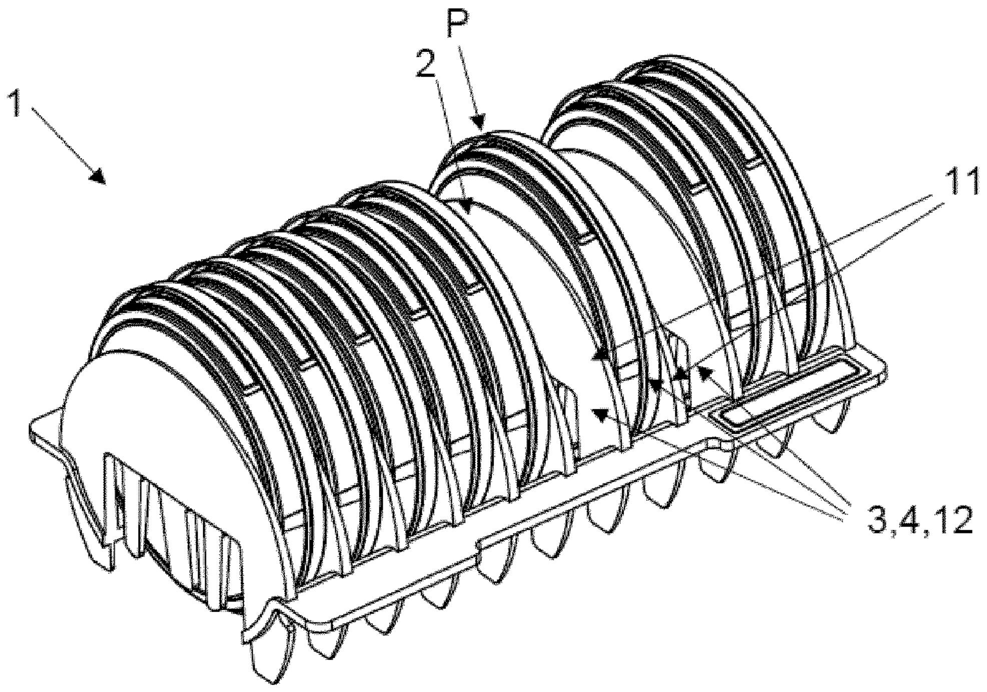
FIG. 2*a* is a perspective view of the rack of FIG. 1*a* with the petri-dishes supported in the rack.
Figure 2B:
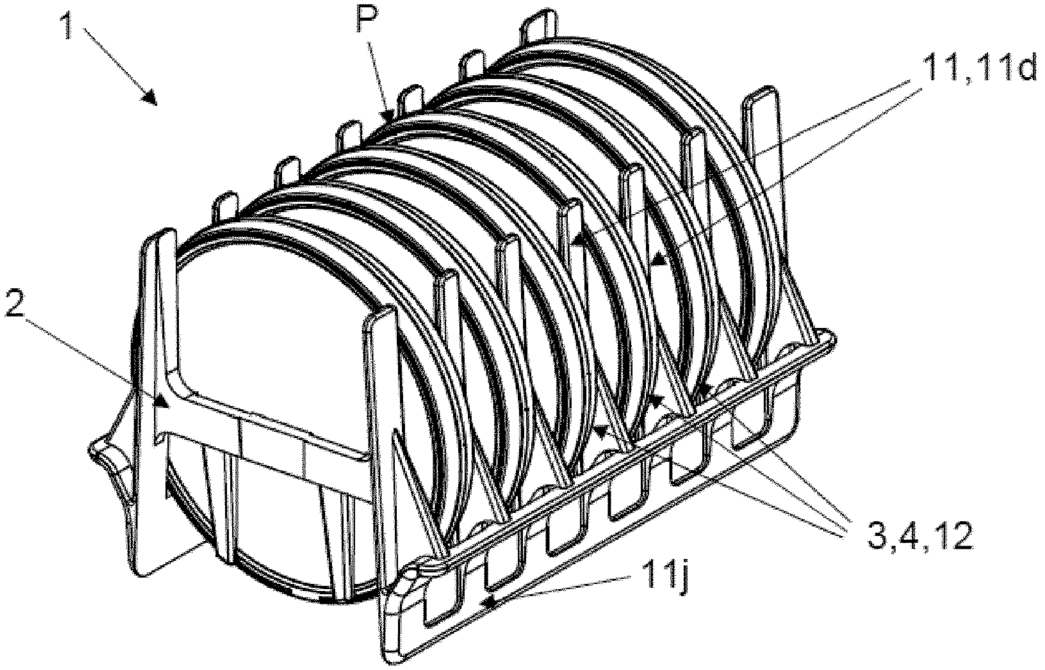
FIG. 2*b* is a perspective view of the rack of FIG. 1*b* with the petri-dishes supported in the rack.
Figure 3:
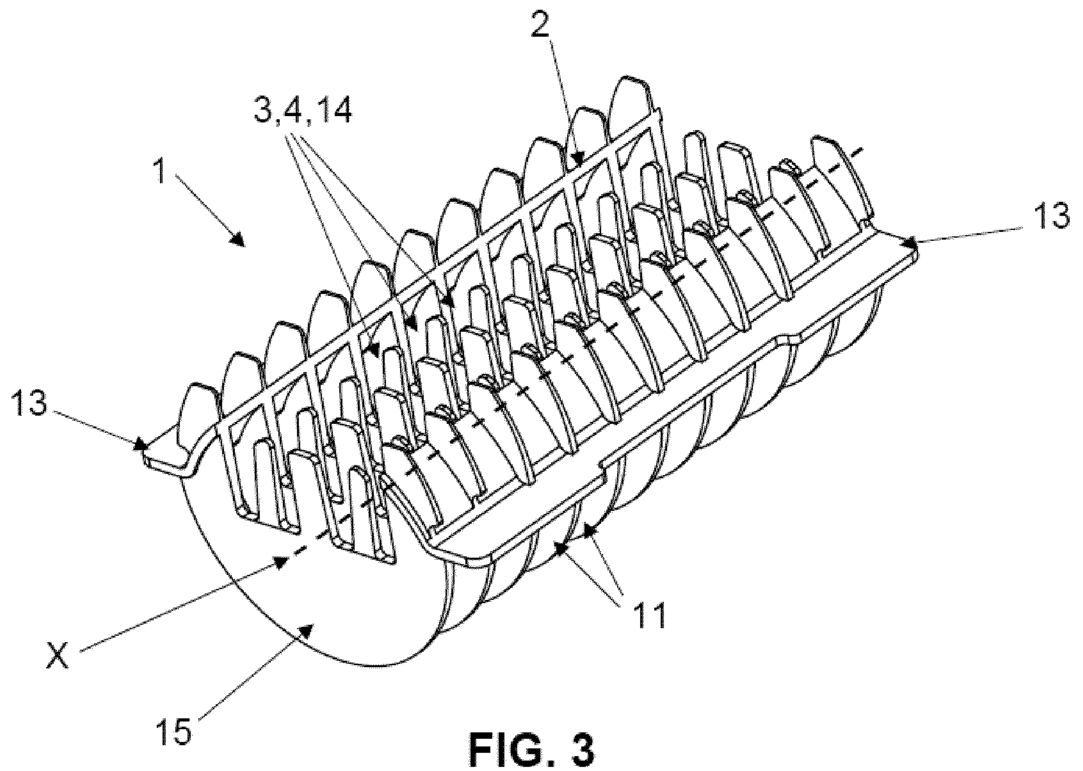
FIG. 3 is a perspective view of the rack of FIG. 1*a* in an upside-down orientation.
Figure 4:
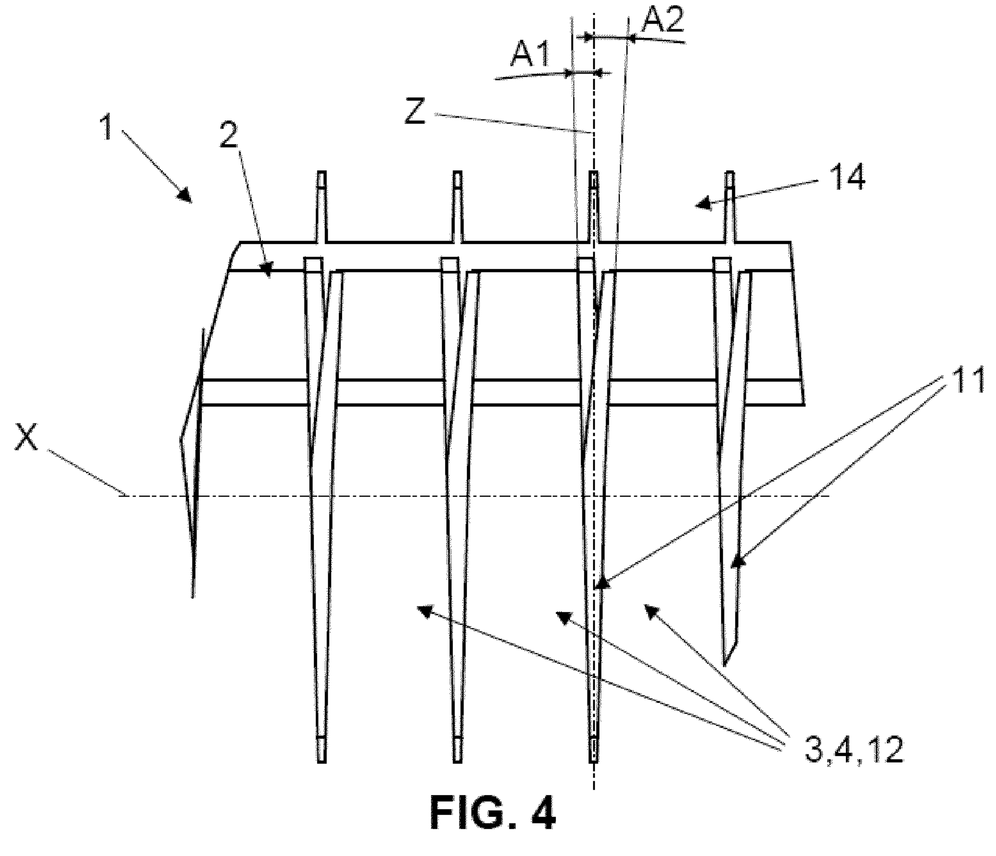
FIG. 4 is a partial cut-away side view of a detail of the rack of FIG. 1*a;*
Figure 5:
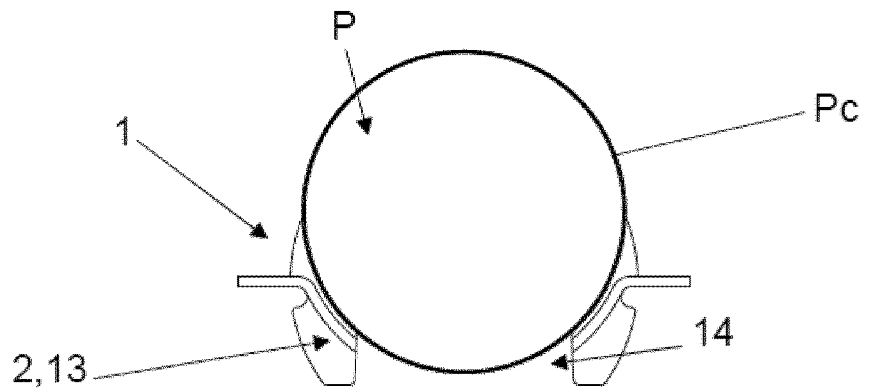
FIG. 5 is a partial cut-away side view of a slot of the rack of FIG. 1*a* as seen from an adjacent slot towards the lid of a petri-dish.

The embodiments of the rack 1 as defined herein for holding a plurality of petri-dishes P as shown in the figures generally comprise a main body 2 in the form of a three-dimensional frame with a plurality of adjacent and regularly spaced apart holding portions 3 which are each configured to receive and support, in a substantially parallel orientation that is substantially perpendicular to a longitudinal direction X of the rack 1, a petri-dish P wherein the holding portions 3 are aligned adjacent to each other in the longitudinal direction X (see FIGS. 2*a*/2*b* where a plurality of petri-dishes P are placed in the rack and FIGS. 3 and 4 where the direction X is indicated).

Figure 1A:
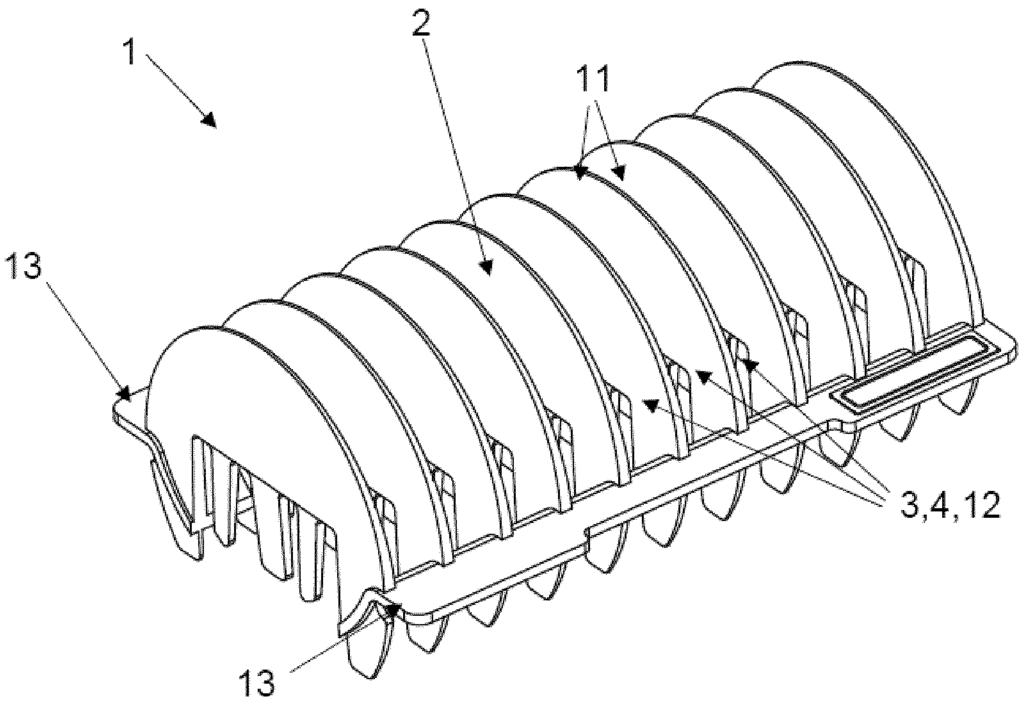
FIG. 1*a* is a perspective view of the rack for holding a plurality of petri-dishes according to an embodiment.

Each holding portion 3 includes positioning features 4 for positioning the petri-dish P in the holding portion 3 and allowing insertion of the petri-dish P from a lateral front side in an insertion direction that is substantially perpendicular to the longitudinal direction X. The lateral front side is the top side as shown in FIGS. 1*a*/1*b* and 2*a*/2*b* and the bottom side in the upside-down orientation of the rack as shown in FIG. 3.

The holding portions 3 and the positioning features 4 respectively comprise a pair of separation elements 11 that are spaced apart from each other in the longitudinal direction X to define therebetween a slot or shelf 12 configured to receive, in a removable manner, the petri-dish P. In the embodiment the slots 12 are arranged so as to be aligned in the axial direction X to form an aligned stack of a row of petri-dishes. Alternative arrangements with a staggered arrangement in two or more substantially parallel rows of aligned petri-dishes are possible, but not shown in the drawing.

Each separation element comprises a base part 11*a* (see FIG. 6) and one or more elastic tab/tabs 11*b*-*i* protruding from the base part 11*a* and configured to releasably engage, preferably at an extreme or free tip end of each tab, with a rim/edge of the petri-dish P when the same is placed in the slot 12. The rim/edge of the petri-dish P may be that of a dish D or of a lid L and common petri-dishes commonly have such rims or edges extending about a periphery on the top/or bottom. Some of the elastic tabs may also engage with a flat surface of the dish or lid by elastically pressing against the surface or may serve as a stand (see the tab 11*d* in FIG. 7).

Figure 6:
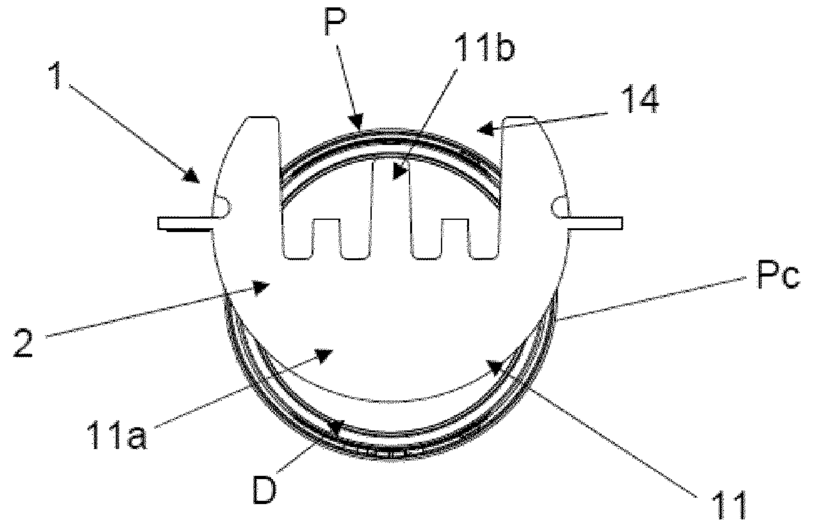
FIG. 6 is a partial cut-away side view of a slot of the rack of FIG. 1*a* in an upside-down orientation as seen from an adjacent slot towards the dish of a petri-dish.
Figure 7:
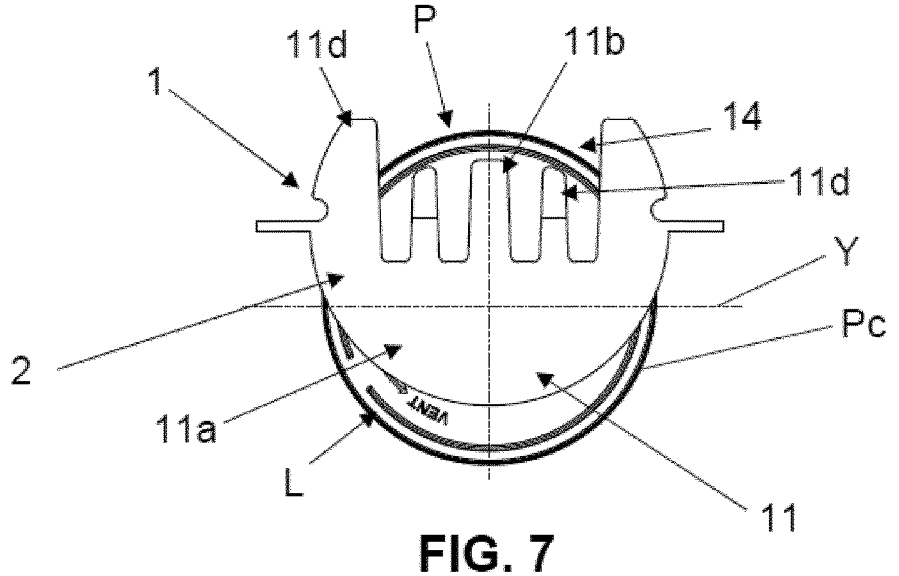
FIG. 7 is a partial cut-away side view of a slot of the rack of FIG. 1*a* in an upside-down orientation as seen from an adjacent slot towards the lid of a petri-dish.

There may be multiple elastic tabs in different orientations and the preferred embodiment has a central tab 11*b* formed and dimensioned to engage with the rim/edge of the dish D at the most inward position in the insertion direction as shown in FIG. 6, and a pair of lateral, symmetrically arranged further tabs 11*c* formed so as to engage with the rim/edge of the lid L of a petri-dish in an adjacent slot at positions on both lateral sides of the most inward position in the insertion direction as shown in FIG. 7.

In such a structure where each separation element 11 comprises at least a pair of the elastic tabs, each of which reaches into a different one of the slots adjacent to the separation element 11, preferably by being inclined from a plane perpendicular to the longitudinal direction X, at least one of the tabs releasably engages with the rim/edge of a dish D of a petri-dish P in the one slot 12 and at least one other tab releasably engages with the rim/edge of a lid L of a petri-dish P in the adjacent slot 12. In this connection each elastic tab may also comprise plural elastic tabs, and the difference is essentially only the intended engagement position. FIG. 4 shows a detail of the separation elements with tabs inclined from the plane perpendicular to the axial direction X towards different adjacent slots.

In the embodiment the tabs protrude from the base part 11*a* in the insertion direction of the petri-dishes into the slots, i.e. they protrude towards the rear side of the rack (which is the upper side in the representation of FIGS. 3, 4, 6 and 7, for example).

Figure 1B:
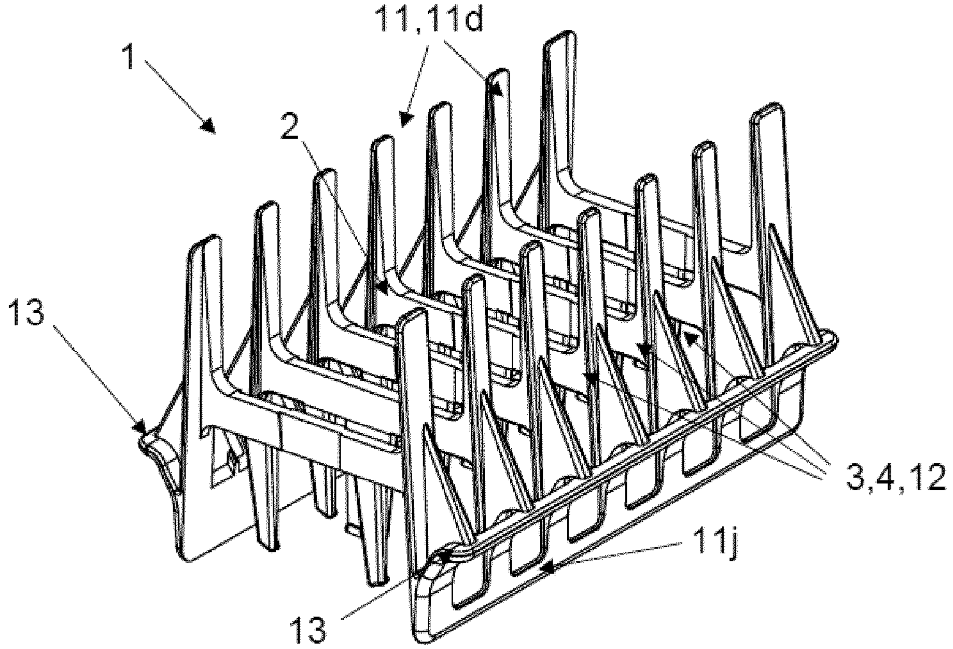
FIG. 1*b* is a perspective view of the rack for holding a plurality of petri-dishes according to another embodiment.

FIGS. 1*b*, 2*b*, 8*b*, 11*b*, 14*b*, 15*b* and 19 show a different embodiment with different arrangements of tabs for releasably engaging with the rim/edge of the petri-dishes in the holding portions 3. The elastic tabs may extend from the base part 11*a* in different directions and they may also protrude, from the base part 11*a*, towards opposite directions as shown in FIGS. 1*b*/2*b*. The base part 11*a* in this embodiment is reduced to a bar bridging a pair of lateral stands 11*k* raised from the lateral supporting beams 13 whereas the base part 11*a* in the other embodiment is more like a plate-shaped semi-circular disk.

The separation elements 11 may include expanded portions 11*d* (see FIG. 7) extending from the base part 11*a* towards the rear or front side in order to additionally support and separate the petri-dishes in the slots 12 and/or serve as stand for the rack 1 to lift off the rack in the substantially horizontal orientation from a supporting surface to avoid contact of the petri dishes with the supporting surface. The expanded portions 11*d* may also be provided only at the separation elements at the ends in the axial direction.

In the embodiment of FIGS. 1*b*/2*b* the expanded portions 11*d* are interconnected to form lateral bars 11*j* extending in the axial direction. In this embodiment, however, the expanded portions may also be provided so as to be separated from each other at the tip ends whereas the interconnection in the form of the lateral bars can also be provided in the embodiment of FIGS. 1*a*/2*a*. Further, in both basic embodiments the number of expanded portions can be reduced such that expanded portions are provided only at some of the separation elements.

Figure 8A:
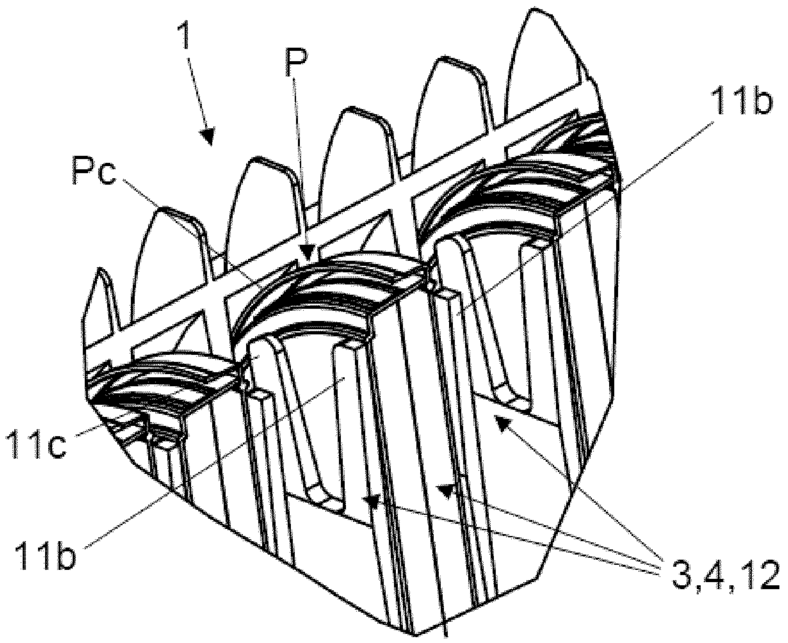
FIG. 8*a* is a partial cut-away perspective view of the rack of FIG. 2*a* in an upside-down orientation.
Figure 8B:
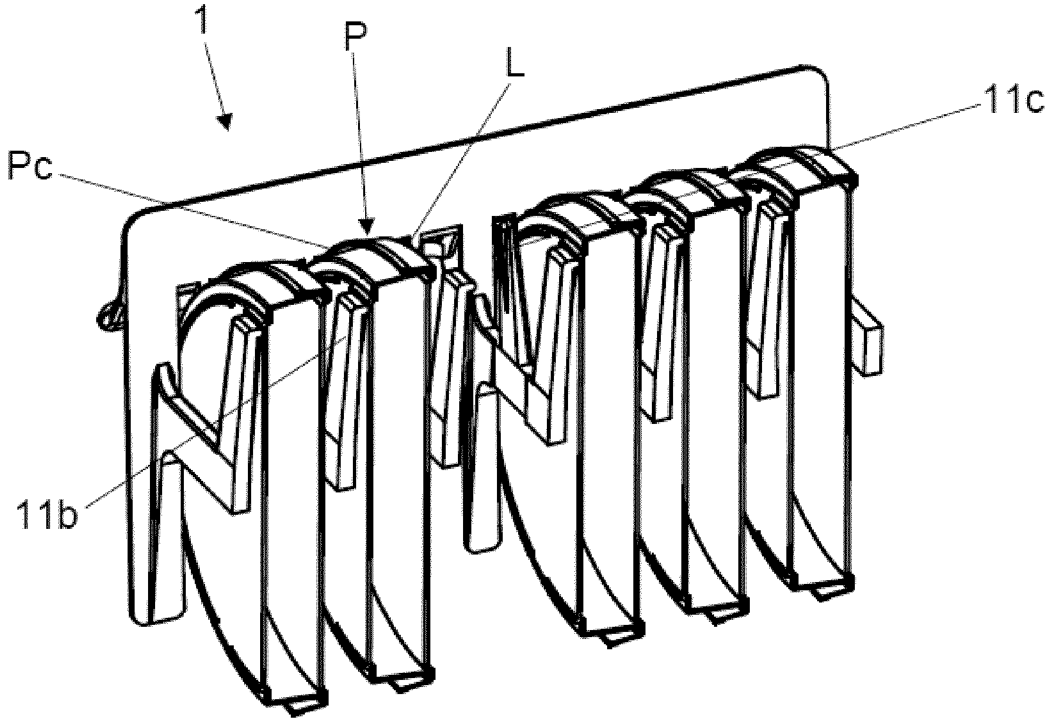
FIG. 8*b* is a partial cut-away perspective view of the rack of FIG. 2*b* in an upside-down orientation.
Figure 9:
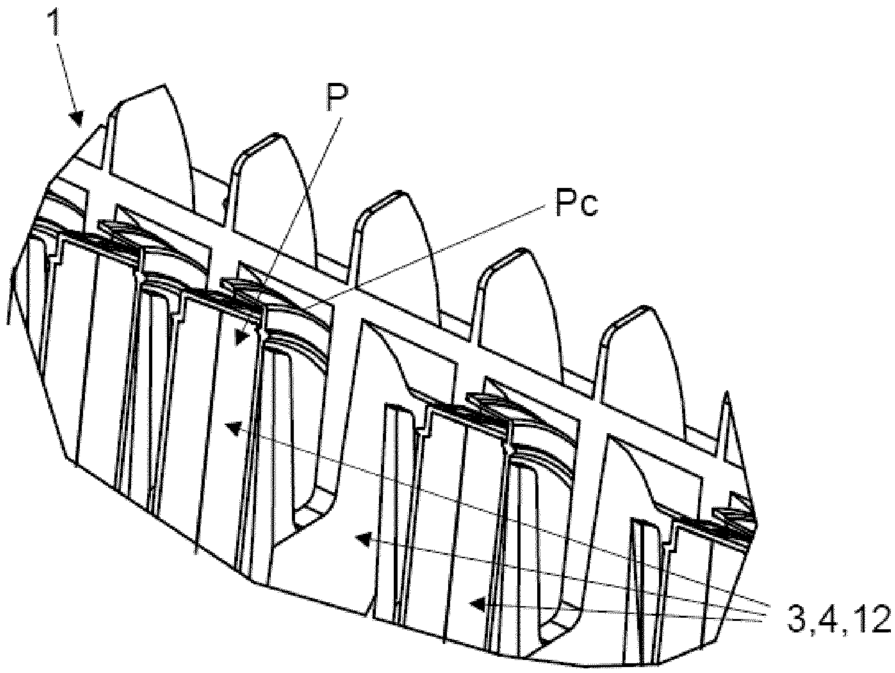
FIG. 9 is a partial cut-away perspective view of the rack of FIG. 2*a* similar to the view of FIG. 8 but from another direction.
Figure 10:
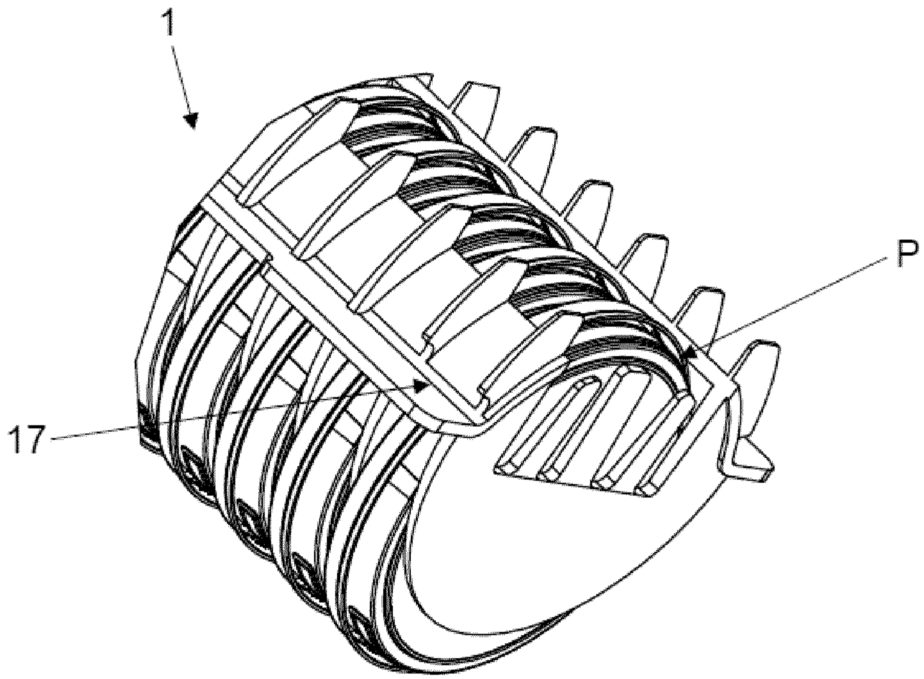
FIG. 10 is a perspective view of a detail of the rack of FIG. 2*a* as seen from an axial end.

FIGS. 8*a*/8*b* and 9 show details of the engagement state between the tip ends of the tabs 11*b*, 11*c* and the rim/edge of the lid L and dish D of the petri-dish in the inserted state. The engagement state of the tabs is reached once the petri-dish is completely inserted into the holding portion 3. The engagement state is defined by a form-locking engagement created by a small protrusion at the tip end of the tabs riding over the rim/edge of the petri-dish due to the elasticity and creating a certain resistance against the movement of the petri-dish in the opposite direction. The resistance is, however, determined so as to allow removal of the petri-dish from the rack by means of a gripper of an automated manipulating device or by hand. It is, however, in any case determined so as to prevent inadvertent falling out of the petri-dish from the rack during regular handling including a turning of the rack into the upside-down orientation or an upright orientation.

Figure 11A:
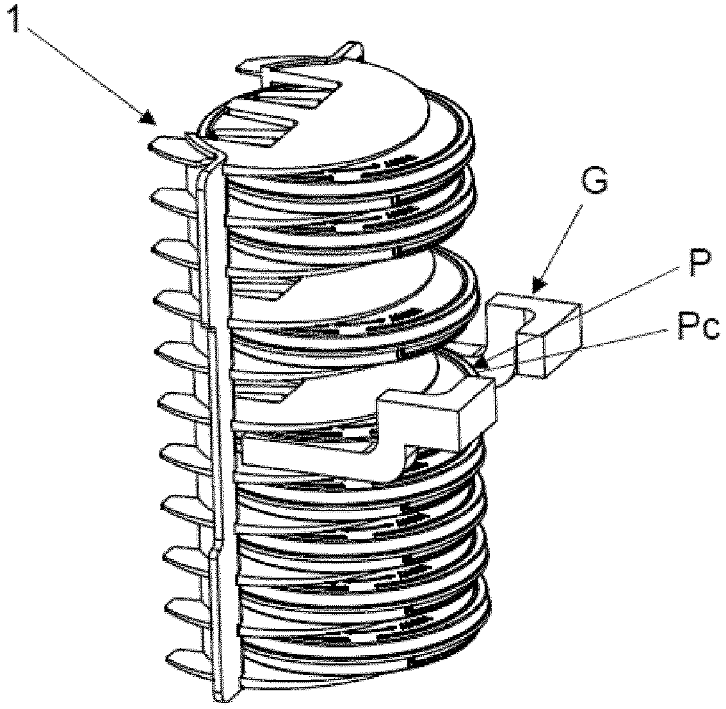
FIG. 11*a* is a perspective view of the rack of FIG. 2*a* in an upright orientation showing the situation that a gripper engages with the petri-dish in the rack.
Figure 11B:
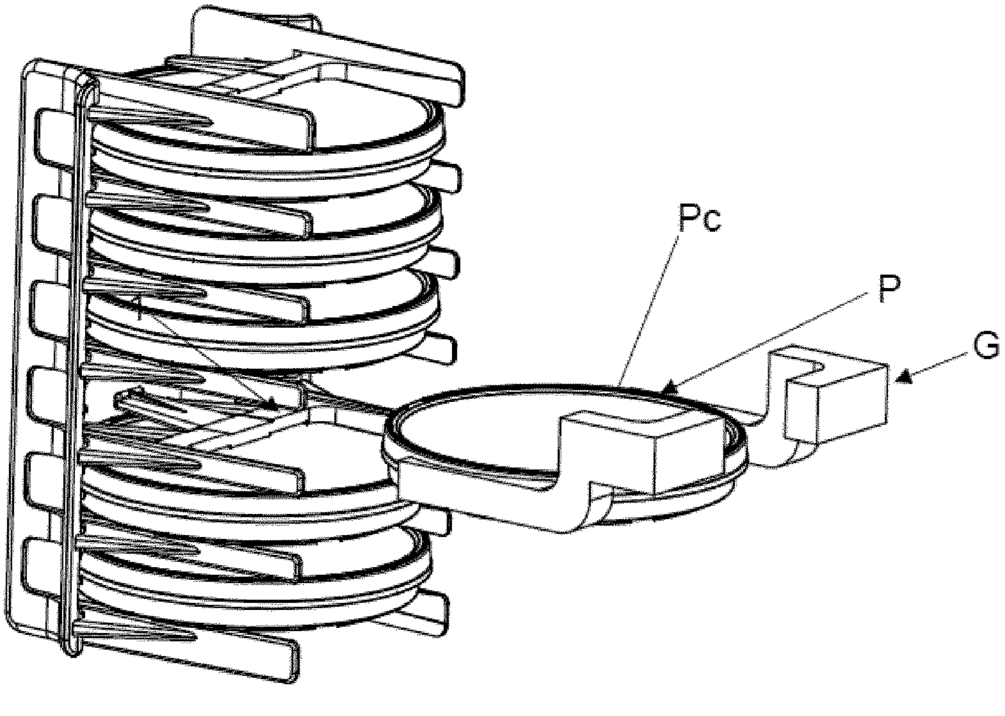
FIG. 11*b* is a perspective view of the rack of FIG. 2*b* in an upright orientation showing the situation that a gripper engages with the petri-dish in the rack.

The holding portions 3 and the positioning features 4 are generally formed and configured to allow insertion of a gripper of a manipulating device or of a pair of fingers from the front lateral side for grabbing/pinching the circumferential peripheral wall Pc of a petri-dish when the same is placed in the holding portion 3. Such a situation is shown in FIGS. 11*a*/11*b* and FIG. 13.

The separation elements 11 defining the spaced apart holding portions 3 are interconnected by a pair of lateral supporting beams 13 that are spaced apart in a width direction Y that is perpendicular to the longitudinal direction X and the lateral supporting beams 13 extend in the longitudinal direction X of the rack 1 so as to be substantially parallel to each other (see FIGS. 1*a*/1*b* and 5 to 7, for example).

The supporting beams 13 accordingly carry therebetween a plurality of the separation elements 11 to form a frame- or cradle-like self-supporting structure of the rack 1. The supporting beams have a plate-like shape with flat upper and/or lower surfaces that protrude towards the lateral sides and that can be placed on supports in a transport packaging or in holding devices described later so as to position the rack in a stable and clearly defined posture. The supporting beams also provide a possibility of holding the rack by hand or by external grippers without the risk of getting in contact with petri-dishes in the rack. The plate-like shape of the beams imparts sufficient stiffness to the rack in order to avoid bending or distortion during handling.

The frame- or cradle-like self-supporting structure formed by the supporting beams 13 and the separation elements 11 has a continuous window 14 open towards a lateral side different from the lateral side for insertion of the petri-dishes. As shown in FIGS. 6 and 7 the window 14 is formed on the side opposite from the lateral side for insertion and the window 14 allow a visual inspection of all the petri-dishes when the same are received in the holding portions. A specific advantage of arranging the window 14 on the rear side from the insertion direction is that the rack with the petri-dishes can be placed upside down in a transport packaging and the visual inspection of the petri-dishes and/or reading of labels with bar code data matrix or RFID on the petri-dishes is still possible through the window 14 without taking out the rack from its packaging (see FIGS. 14*a*/14*b* and 15*a*/15*b*).

Figure 12:
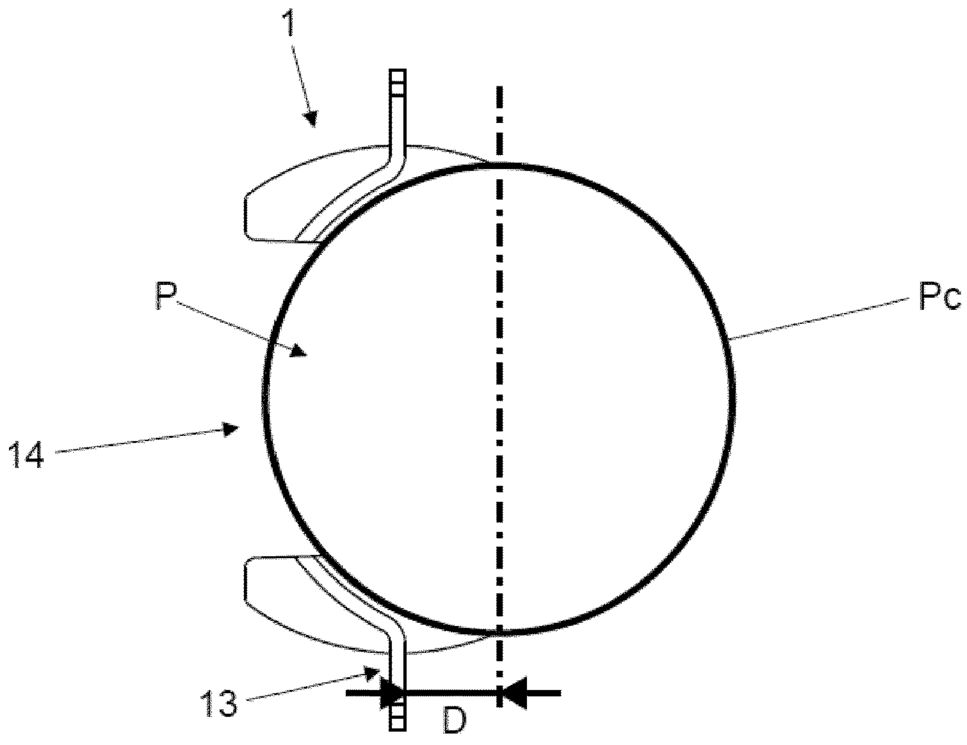
FIG. 12 is a partial cut-away side view of a slot of the rack of FIG. 1*a* as seen from an adjacent slot towards the lid of a petri-dish.
Figure 13:
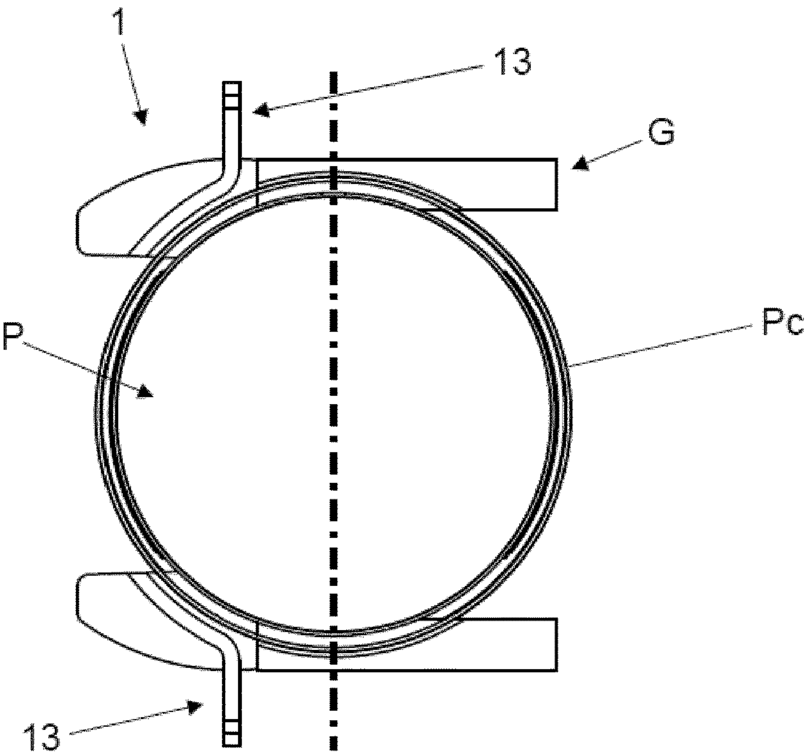
FIG. 13 is a perspective, partially cut-away side view of the rack of FIG. 10 showing the engaging state of the gripper.

As shown in FIGS. 12 and 13 the lateral supporting beams 13 are displaced from a virtual horizontal plane through the centres of the petri-dishes held in the rack by a distance D towards the rear side of the rack. This allocates a larger free space for easily catching and grabbing the petri-dishes about their diameter by hand or by a gripper G. Due to the engagement of the elastic tabs with the edges/rims of the petri-dishes, the petri-dishes are nevertheless not prone to fall out from the holding portions despite of the large free and unsupported circumference.

Figure 16:
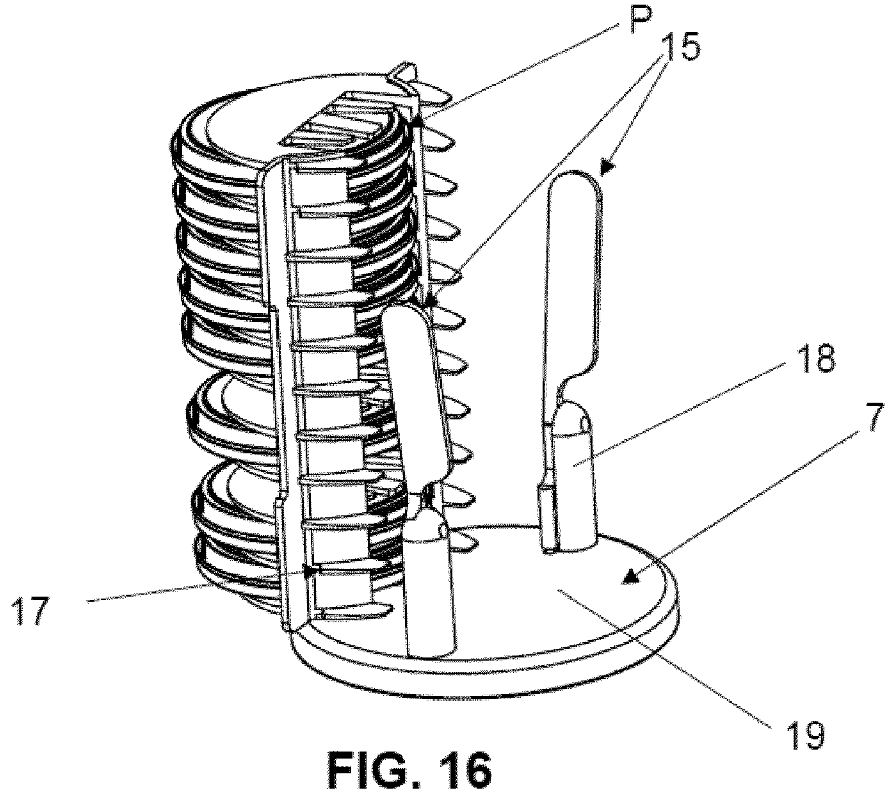
FIG. 16 is a perspective view of the rack of FIG. 2*a* in an upright orientation on an external stand before engagement.
Figure 17:
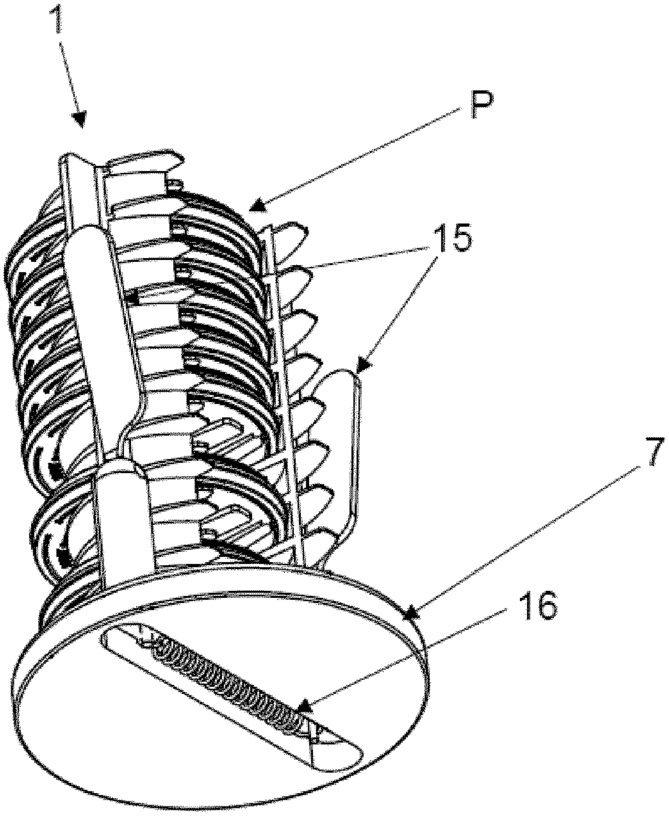
FIG. 17 is a perspective view of the rack and stand of FIG. 16 as seen from below to show a detail of the stand.

As shown in FIGS. 16 and 17, the cradle-like self-supporting structure may include an external stand 7 that is configured to hold the structure in an upright orientation such that the petri-dishes P can be received and supported in the substantially horizontal orientation in the respective holding portions 3 of the rack 1. The rack 1 may be provided, preferably on the lateral sides and further preferably at the supporting beams 13 with notches or other features allowing an engagement between levers or other mating holding elements 15 to secure the rack in the stand. The levers 15 shown in FIGS. 16 and 17 are only examples, and various designs are possible so as to fulfil the purpose of releasably holding the rack in the upright orientation without hindering insertion and removal of the petri-dishes from the holding portions.

In the example of the stand 7 shown in FIGS. 16 and 17 the holding elements 15 may be biased towards each other and accordingly into engagement with a mating engagement portion of the rack by means of a spring or elastic band or spring 16 biasing the holding elements into the engagement position. As shown in FIG. 17, the spring or elastic band may be placed in a receptacle in the bottom of a base plate of the stand 7 so as to be concealed from the outside. The holding elements thus can be pivoted on posts 18 erected from the base 19 as shown in FIG. 16.

Figure 18:
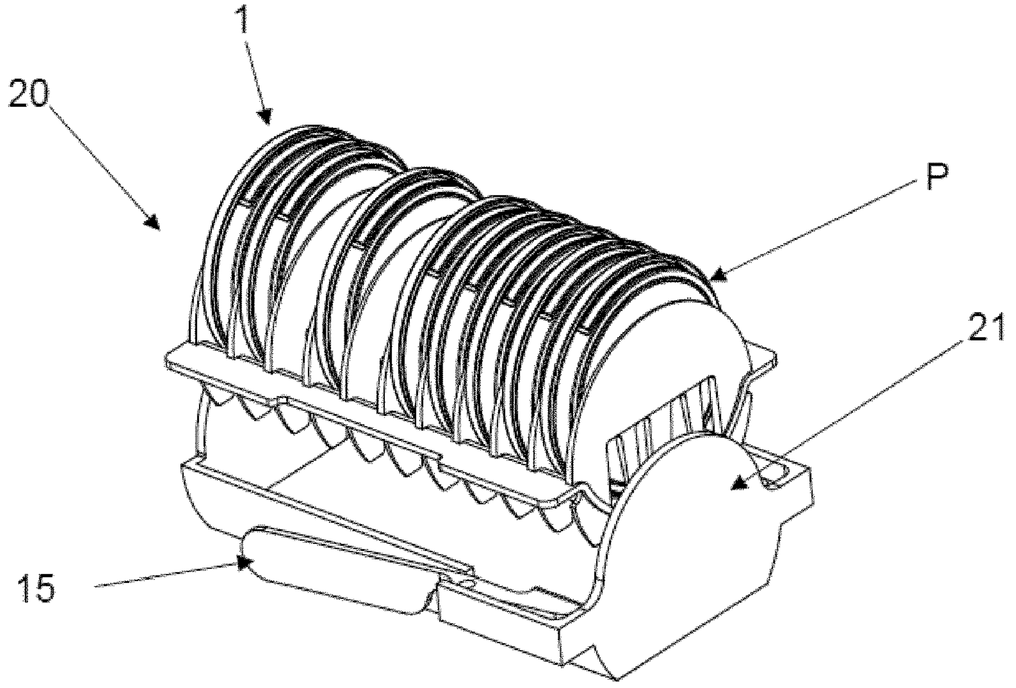
FIG. 18 is a perspective view of the rack of FIG. 2*a* in a horizontal orientation on a holding or transport cradle before engagement.
Figure 19:
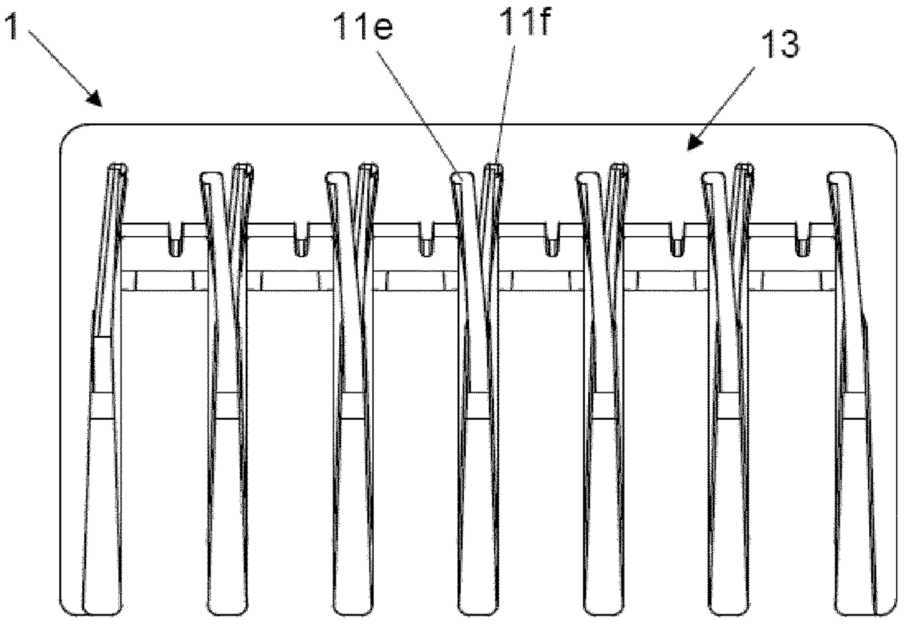
FIG. 19 is a partial cut-away perspective view of the rack of FIG. 1*b* showing a detail of the separation elements.

The rack 1 as defined herein is also compatible with a transport or holding cradle or device 21 as shown in FIG. 18 as an example. Such transport or holding cradle or device may be used in conjunction with an automated transfer mechanism for transferring the rack into or out from an isolator or clean production area. The cradle or holding device 21 may be provided with the engagement features 15 corresponding to or compatible with those of the stand 7 shown in FIG. 17 and accordingly adapted to engage with the mating engagement portions of the rack as described above. In this case the rack can be easily transferred between various stages of the process where either the cradle 21 or the stand 7 is provided to hold the rack in the proper orientation.

Figure 14A:
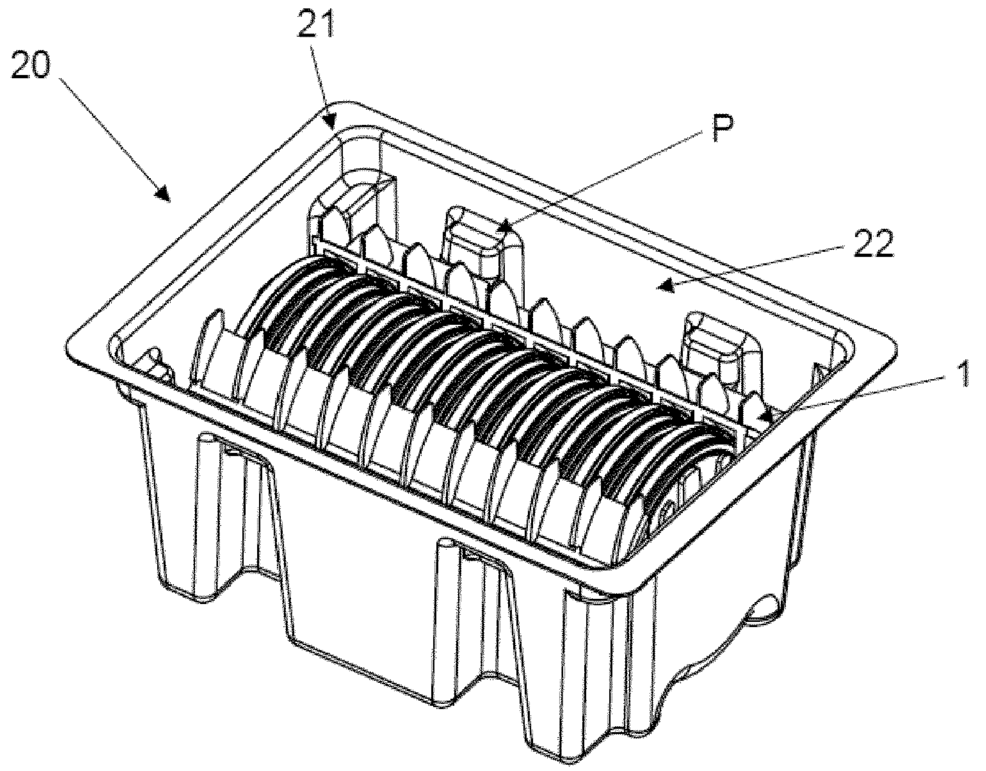
FIG. 14*a* is a perspective view of a transport packaging in the form of a box-shaped tub with a single rack of FIG. 2*a* placed in the tub in an upside-down orientation.
Figure 14B:
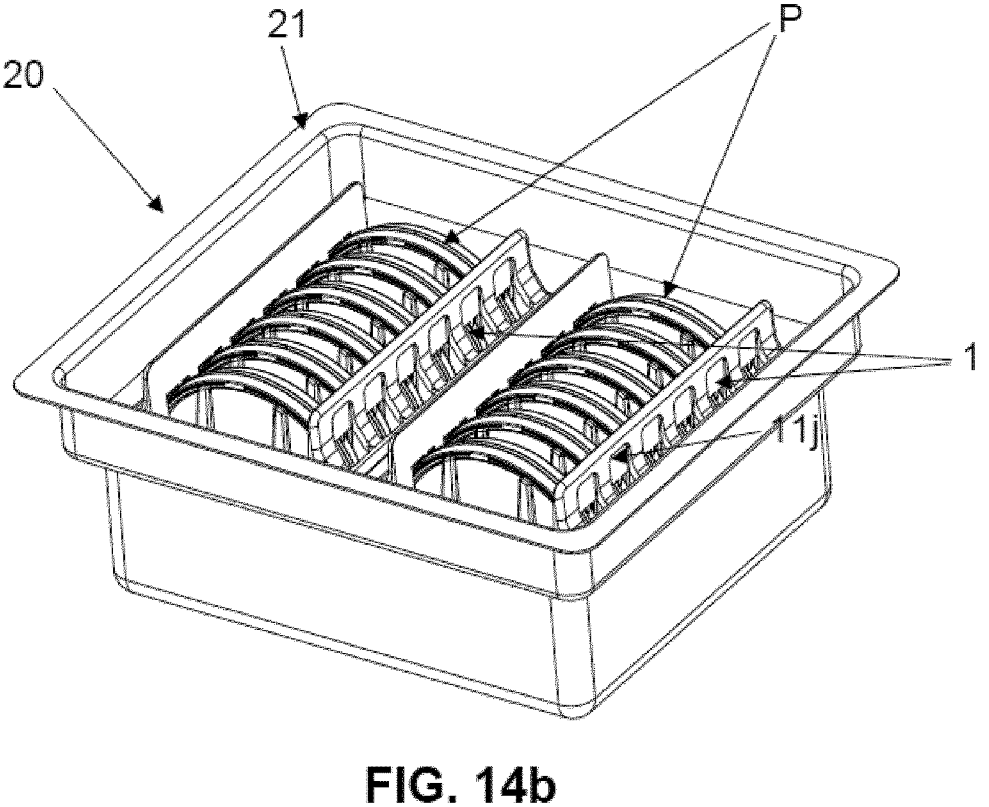
FIG. 14*b* is a perspective view of a transport packaging in the form of a box-shaped tub with a pair of racks of FIG. 2*b* adjacent to each other.
Figure 15A:
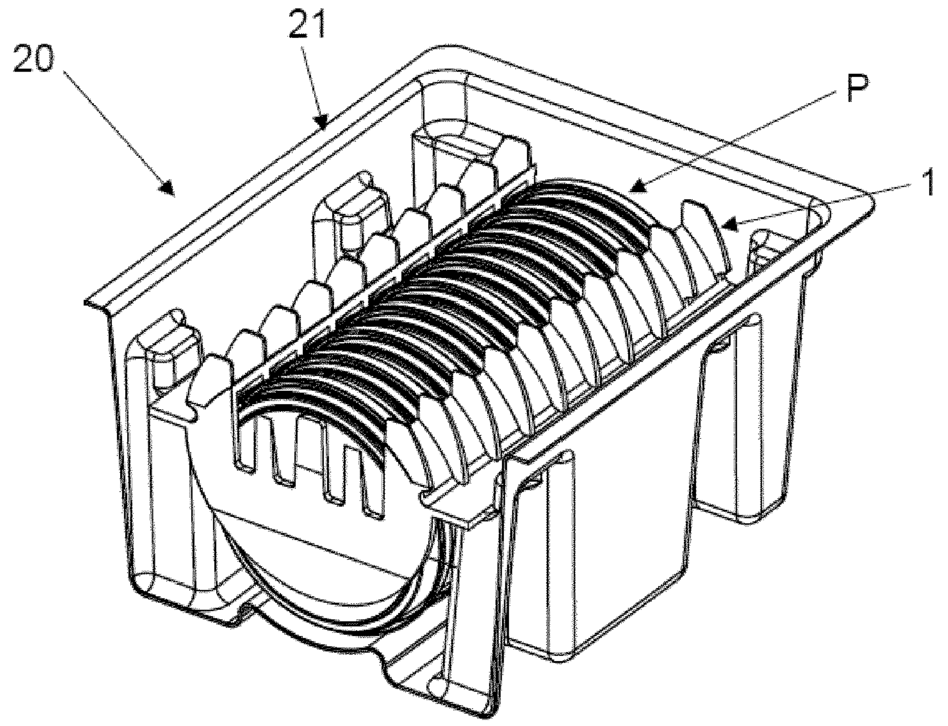
FIG. 15*a* is a partial cut-away perspective view of the transport packaging of FIG. 14*a* as seen from another direction.
Figure 15B:
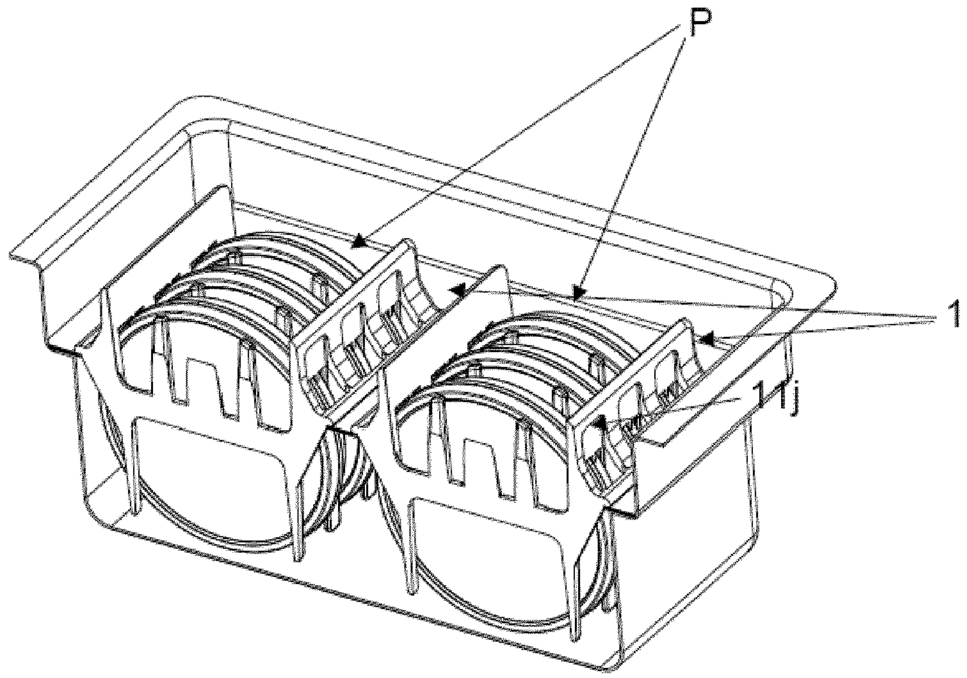
FIG. 15*b* is a partial cut-away perspective view of the transport packaging of FIG. 14*b* as seen from another direction.

Further, in the embodiment of FIGS. 1*b*/2*b*, where the expanded portions 11*d* are interconnected to form lateral bars 11*j* extending in the axial direction, the lateral bars may serve as a grip as shown in FIGS. 14*b* and 15*b* that allows gripping and lifting of the rack from a box-shaped tub described later in a situation where the lateral supporting beams 13 are not accessible or are not provided. The lateral bars 11*j* serving as grips 22 may be similar to the supporting beams, but protrude in a different direction.

The rack may be integrally formed from any suitable material, preferably plastic, preferably by injection molding. Other manufacturing processes are available, including 3D printing. Metal in the form of cast metal or sheet metal or 3D-printed metal is available if the rack is designed for multi-use that requires sterilization between uses. The rack may be formed from different elements that are interconnected, for example a pair of the lateral supporting beams 13 connected to plural separation elements 11, either fixed and not separable (i.e. by glueing or welding) or releasably (by a form-locking engagement or by mechanical fasteners like screws). In this structure different sizes of the rack for different numbers of petri-dishes to be grouped can be easily configured by providing supporting beams 13 of different lengths and configured to be connected to identical separation elements 11 in the desired spacing.

The rack 1 with a group of petri-dishes can be packaged and sealed in a bag (not shown) or in a cavity 22 of a more rigid box-shaped tub 21 as shown in FIGS. 14*a*/14*b*, and 15*a*/15*b* that respectively removably receive and completely surround the rack with the petri-dishes. Accordingly, the rack with the box-shaped tub or bag forms a transport packaging 20 for a plurality of petri-dishes P. If desired the rack and the stand can be arranged in the transport packaging to be available at the point of use but the stand 7 may also be omitted if the rack alone is sufficient for the desired handling and purpose.

The box-shaped tub 21 is formed as a one-piece blister cavity, preferably is formed from a formable sheet of a plastic material, further preferably by thermal forming or cold-forming or a combination of the two. The tub 21 may be designed for one-time use or may be reusable.

The opening of the box-shaped tub 21 is configured to be sealed by a gas-barrier film, preferably at least partially transparent, to form a blister-like packaging. In conjunction with a sterilized set of petri-dishes held in the rack such sealed transport packaging provides a useful unit for use in connection with the environmental monitoring as described in the introductory portion of this specification. In a preferred embodiment the box-shaped tub 21 and the rack 1 are made from the same material, thus facilitating the waste-processing of the material after use.

Traceability elements in the form of a bar code, a data matrix or a RFID may be accommodated and provided on the present rack 1 or on the box-shaped tub 21 and/or directly on the petri-dishes P.

Based on the traceability elements all critical process data may be recorded and linked through an integrated RFID-type system or via an external system, for example cloud-based. For example, such a process may include a number of typical stations or stages of the process where specific data is collected and recorded like the storage stage S1 (time/date of entrance, storage temperature, moisture level, expiry date management, fifo management), transportation stage S2 (duration and temperature), grouping stage S3 (position or group to which the individual petri-dishes belong), transfer stage S4 (location and time), air sampling stage S5 (duration, location, time/date, link of the ID of the plate with the ID of the rack ID), incubation stage S6 (time/date of entrance, real temperature, moisture level, oxygen level), counting stage S7 (time/date and counting results) where counting takes place in order to determine the number of contaminants. At stage S8 all the data are exported and transferred to a storage from where they can be accessed and further processed.

The traceability can be realized externally with dedicated RFID reader systems connected to a central system, but the RFID (or data matrix) reader can also be driven directly from an air monitoring system which allows full traceability of the process plate including:

- positive detection of the processed plate using data matrix reader;
- positive detection of the plate storage location (e.g. transport cage) using data matrix or RFID;
- allowing read and write information in the RFID tag of the present rack(s) containing the plate(s) or petri-dishes;
- each tag may contain the following information: batch number, location site number, set number, ID of the plate, position of the plate in a stack or inside a blister pack;
- time when the plate was placed and removed from the isolator;
- hour of the sampling, conformity of the air monitoring parameters, operator, events during the presence of the blister in the sampling environment.

The invention claimed is:

1. A rack for holding a plurality of petri-dishes, comprising:

a main body with a plurality of adjacent and spaced apart holding portions each configured to receive and support, in a substantially parallel orientation that is substantially perpendicular to a longitudinal direction of the rack, a petri-dish, wherein each holding portion includes positioning features for positioning the petri-dish in the holding portion and allowing insertion of the petri-dish from a lateral side in a direction substantially perpendicular to the longitudinal direction, wherein each of the plurality of adjacent and spaced apart holding portions and positioning features, respectively, comprise a pair of separation elements spaced apart from each other to define therebetween a slot configured to receive the petri-dish, and wherein each separation element of the pair of separation elements comprises a first elastic tab and a second elastic tab, respectively reaching into a first slot and a second slot, each of said first slot and second slot being adjacent to said each separation element of the pair of separation elements, so that the first elastic tab releasably engages with a rim or an edge of a dish of a first petri-dish when the first petri-dish is placed in the first slot and the second elastic tab releasably engages with a rim or an edge of a lid of a second petri-dish when placed in the second slot.

2. The rack according to claim 1, wherein the plurality of adjacent and spaced apart holding portions and positioning features are formed and configured to allow insertion of a gripper of a manipulating device or insertion of a pair of fingers from the lateral side for grabbing or pinching a circumferential peripheral wall of a petri-dish when the petri-dish is placed in the holding portion.

3. The rack according to claim 1, wherein the separation elements are connected by a pair of spaced apart lateral supporting beams extending in the longitudinal direction of the rack and carrying therebetween the separation elements defining the plurality of adjacent and spaced apart holding portions so as to form a self-supporting cradle-shaped structure.

4. The rack according to claim 3, wherein the self-supporting cradle-shaped structure has windows open toward a lateral side different from the lateral side for insertion of the plurality of petri-dishes, and wherein the windows allow visual inspection of the plurality of petri-dishes when the plurality of petri-dishes are received in the plurality of adjacent and spaced apart holding portions.

5. The rack (1) according to claim 3, wherein the self-supporting cradle-shaped structure includes a stand configured to hold the self-supporting cradle-shaped structure in an upright orientation such that the plurality of petri-dishes can be received and supported in a substantially horizontal orientation in the plurality of adjacent and spaced apart holding portions.

6. A transport packaging for a plurality of petri-dishes, comprising:

the rack according to claim 1; and a box-shaped tub configured to removably receive and surround the rack.

7. The transport packaging according to claim 6, wherein the box-shaped tub is formed as a one-piece blister cavity.

8. The transport packaging according to claim 6, wherein the box-shaped tub and the rack are made from an identical material.

9. The transport packaging according to claim 6, further comprising a plurality of petri-dishes accommodated in the corresponding slots of the rack.

10. A blister packaging with a plurality of petri-dishes, comprising:

a transport packaging according to claim 9, wherein the plurality of petri-dishes is accommodated in the rack in the box-shaped tub in a sterile environment; and a gas barrier film sealing an opening of the box-shaped tub.

11. The rack according to claim 1, wherein each of the first tab and the second tab is configured to releasably engage at a tip end of the first tab and the second tab with the rim or the edge of first the petri-dish when the first petri-dish is placed in the first slot or with the rim or the edge of the second petri-dish when the second petri-dish is placed in the second slot, respectively.

12. A rack for holding a plurality of petri-dishes, comprising:

a main body with a plurality of adjacent and spaced apart holding portions each configured to receive and support, in a substantially parallel orientation that is substantially perpendicular to a longitudinal direction of the rack, a petri-dish, wherein each holding portion includes positioning features for positioning the petri-dish in the holding portion and allowing insertion of the petri-dish from a lateral side in a direction substantially perpendicular to the longitudinal direction, wherein each of the plurality of adjacent and spaced apart holding portions and positioning features, respectively, comprise a pair of separation elements spaced apart from each other to define therebetween a slot configured to receive the petri-dish, and wherein each separation element of the pair of separation elements comprises a first elastic tab and a second elastic tab wherein the first elastic tab and the second elastic tab are inclined, from a reference plane perpendicular the longitudinal direction, into a first slot and a second slot, each of said first slot and second slot being adjacent to said each separation element of the pair of separation elements, so that the first elastic tab releasably engages with the rim or the edge of a dish of a first petri-dish in the first slot and the second elastic tab releasably engages with the rim or the edge of a lid of a second petri-dish in the second slot.

13. The rack according to claim 3, wherein the self-supporting cradle-shaped structure has windows open toward a lateral side, opposite from the lateral side for insertion of the plurality of petri-dishes, and wherein the windows allow visual inspection of the plurality of petri-dishes when the plurality of petri-dishes are received in the plurality of adjacent and spaced apart holding portions.

14. The transport packaging according to claim 6, wherein the box-shaped tub is formed as a one-piece blister cavity formed from a formable sheet or web material.

15. The transport packaging according to claim 6, wherein the box-shaped tub is formed as a one-piece blister cavity formed by a thermoforming process, or a cold-forming process, or a combination thereof.

16. The blister packaging with a plurality of petri-dishes (P) according to claim 10, wherein the gas barrier film is at least partially transparent.

* * * * *